US006592921B2

(12) United States Patent
Taylor et al.

(10) Patent No.: US 6,592,921 B2
(45) Date of Patent: Jul. 15, 2003

(54) METHOD OF REMOVING THE HULL FROM CORN KERNELS

(75) Inventors: Frank Taylor, Willow Grove, PA (US); Vijay Singh, North Wales, PA (US)

(73) Assignees: The United States of America, as represented by the Secretary of Agriculture, Washington, DC (US); The Board of Trustees of the University of Illinois, Urbana, IL (US)

( * ) Notice: Subject to any disclaimer, the term of this patent is extended or adjusted under 35 U.S.C. 154(b) by 141 days.

(21) Appl. No.: 09/955,329

(22) Filed: Sep. 18, 2001

(65) Prior Publication Data

US 2003/0068415 A1 Apr. 10, 2003

(51) Int. Cl.[7] .................................................. A23L 1/00
(52) U.S. Cl. ........................ 426/312; 426/482; 426/518
(58) Field of Search ................................ 426/312, 481, 426/482, 518, 618

(56) References Cited

U.S. PATENT DOCUMENTS 5,250,313 A * 10/1993 Giguere ...................... 426/482

OTHER PUBLICATIONS

Notsinger, G.W., et al., "Field Trials Using Extenders for Ambient–Conditioning High–Moisture Corn", *Transactions of the ASAE*, vol. 22(5), pp. 1208–1213, 1979.

Singh, V., et al., "Effect of Soak Time, Soak Temperature, and Lactic Acid on Germ Recovery Parameters", *Cereal Chem.*, vol. 73(6), pp. 716–720, 1996.

Du, L., et al., "Comparison of Alkali and Conventional Corn Wet–Milling: 1–kg Procedures", *Cereal Chem.*, vol. 76(5), pp. 811–815, 1999.

Morgan, A.I., et al., "Peeling Grain", *Food Technology*, pp. 40–43, Aug., 1964.

Eckhoff, S.R., et al., "A Laboratory Wet–Milling Procedure to Increase Reproducibility and Accuracy of Product Yields", *Cereal Chem.*, vol. 70(60, pp. 723–727, 1993.

Folch, J., et al., "A Simple Method for the Isolation and Purification of Total Lipides from Animal Tissues", *J. Biol. Chem.*, vol. 226(1), pp. 497–509, 1957.

Hamilton, J.G., et al., "Separation of Neutral Lipid, Free Fatty Acid and Phospholipid Classes by Normal Phase HPLC", *Lipids*, vol. 23(12), pp. 1150–1153, 1988.

Thomas, K.C., et al., "Fuel Alcohol Production: Effects of Free Amino Nitrogen on Fermentation of Very–High–Gravity Wheat Mashes", *Applied and Environmental Microbiology*, vol. 56(7), pp. 2046–2050, Jul. 1990.

Strecker, L.R., et al., Corn Oil, In *Bailey's Industrial Oil and Fat Products*, vol. 2, Y.H. Hui, ed., p. 143.

Bagley, E.B., "Decontamination of corn Containing Aflatoxin by Treatment with Ammonia", *J. American Oil Chemists'Society*, vol. 56, pp. 808–811, Sep. 1979.

Valco, T.D., "Ammoniation of Aflatoxin–Contaminated Corn", *Texas Agricultural Extension Service*, L–2459.

* cited by examiner

*Primary Examiner*—George C. Yeung
(74) *Attorney, Agent, or Firm*—John Fado; G. Byron Stover

(57) ABSTRACT

A method of removing the hull from corn kernels wherein the method involves exposing the corn kernels to ammonia (e.g., gas-phase anhydrous) under conditions effective to remove the hull from corn kernels.

14 Claims, 2 Drawing Sheets

Typical Reactor Exposure Data

Oil Yield, Dry Corn Basis

METHOD OF REMOVING THE HULL FROM CORN KERNELS

BACKGROUND OF THE INVENTION

The present invention concerns a method of removing the hull from corn kernels wherein the method involves exposing the corn kernels to ammonia (e.g., gas-phase anhydrous) under conditions effective to remove the hull from corn kernels.

Current technology for the large-scale conversion of corn (maize) to value-added products involves either a wet milling process or a dry milling process. The corn wet milling process begins by steeping (soaking) the corn kernels in water which contains added $SO_2$. Steeping may take up to 48 hours in large expensive steep tanks. Steeping softens the corn so that coarse grinding will release the intact germ which can be separated and processed to recover the oil; further grinding then permits separation of the remaining components (e.g., fiber, protein and starch). However, building a corn wet mill requires a large capital investment. In contrast, although less capital intensive, the dry milling process to make food products or fuel ethanol suffers from low co-product value.

The wet milling process and the dry milling process can be modified by removing the hull (pericarp) of the corn kernel as the first processing step. In a modification of the dry-grind process known as Quick-Germ, the germ can be recovered after 12 hours soaking to improve the co-product credits (Singh, V., et al., Cereal Chemistry, 73(6): 716–720 (1996)). Diffusion of water into the kernel during steeping or soaking is slow because the hull (pericarp) covering the kernel forms a waterproof barrier, the time required for steeping in the wet milling process or soaking in the Quick-Germ process can be reduced if the pericarp is removed. Alkali debranning of grains is usually done with a caustic soda (NaOH) solution, which loosens the hulls, so that mechanical equipment may remove and separate the hulls from the grain. (Du, L., et al., Cereal Chemistry, 76(5): 811–815 (1999)); Morgan, A. I., et al., Food Technology, pp. 40–43 (August 1964)). However, treatment with alkali has certain disadvantages: When treating with caustic solution, most of the alkali remains external to the corn. Although the solution can be reused a number of times, it eventually must be discarded and replaced with fresh solution. The consumption of sodium hydroxide is typically 2 to 3% of treated grain. Disposal of the waste can be very expensive.

We have discovered a superior method of removing the pericarp by exposing the grain to ammonia (e.g., gas-phase anhydrous) which diffuses into the kernel more easily than liquid caustic and dissolves in the moisture that constitutes approximately 15% of dry corn. Because the resulting strong base solution will be entirely inside the kernel, the time, temperature and amount of base needed is less than with caustic solution. Ammonia is also less expensive than caustic. Residual ammonia in the corn remaining after debranning and germ recovery can supply the nitrogen requirement for yeast to ferment corn to ethanol. This ammonia treatment loosens the pericarp from whole corn using no more ammonia than needed to supply the nitrogen requirement for yeast fermentation. Ammonia treatment also helps to separate the starch and protein from fiber in the remaining corn.

SUMMARY OF THE INVENTION

The present invention concerns a method of removing the hull from corn kernels wherein the method involves exposing the corn kernels to ammonia (e.g., gas-phase anhydrous) under conditions effective to remove the hull from corn kernels.

DETAILED DESCRIPTION OF THE INVENTION

Figure 1:
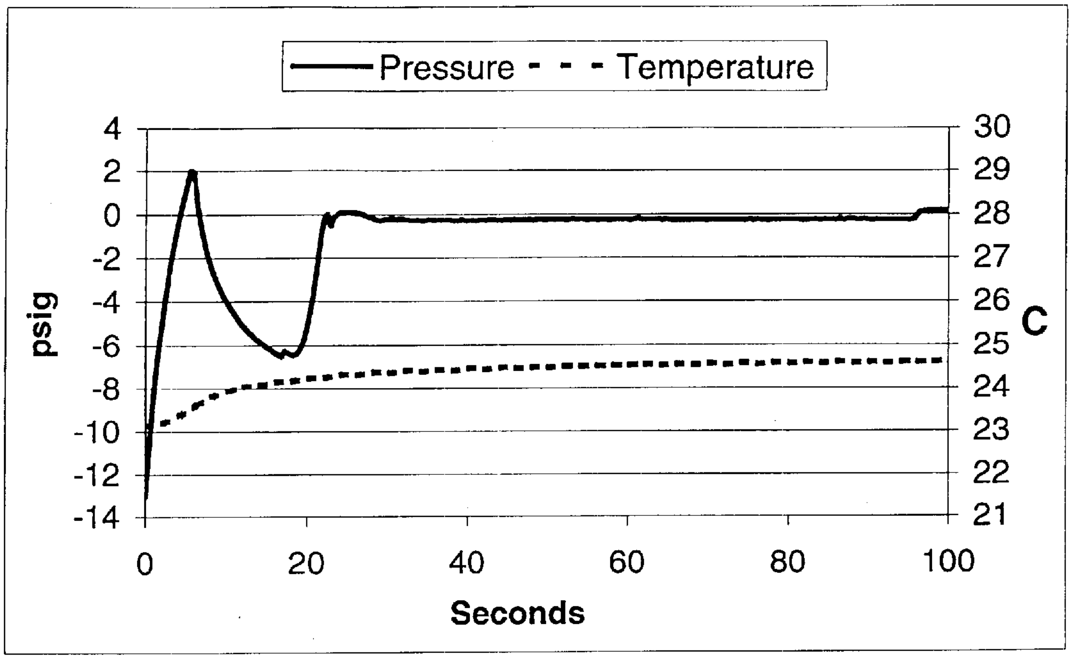
FIG. 1 shows pressure and temperature data during anhydrous ammonia treatment of corn.

The use of ammonia to remove the hull from corn kernels provides several advantages. On the basis of equal equivalents of alkali, ammonia is less expensive than caustic. To make fuel ethanol, the addition of ammonia or some other amino nitrogen source is necessary to provide nutrition to the yeast during fermentation; adding the ammonia at the beginning of the process thus serves two purposes: loosening the pericarp and providing nutrition to the yeast. The high diffusion rate of gaseous ammonia allows it to quickly penetrate into the layer between the pericarp and endosperm, and the amount of ammonia consumed can be reduced to only the amount needed for fermentation. Using ammonia, the fiber retains its integrity and is not dissolved as in treatment with caustic solution or reduced to fine particles with dry milling. Another advantage of ammonia treatment over conventional wet milling is that the large, expensive counter-current steeping tanks (normally required to provide a long steeping time) can be eliminated or greatly reduced in size. Also, although low quality fiber byproducts are recovered from both wet and dry milling, intact pericarp is a much more valuable source of value added products. Another advantage over dry milling for fuel ethanol is the recovery of germ which can be processed into valuable corn oil. Fuel ethanol production consumed 550 million bushels of corn in 1998, six percent of the total corn crop, and increases to ten percent of total usage are likely in the next few years. Integration of the present invention into new process technology for conversion of corn to value added products has the potential to improve the economic prosperity of corn farmers and fuel ethanol producers, while providing high quality affordable livestock feed ingredients and value added products to consumers.

The present invention concerns a method of removing the hull from corn kernels involving exposing the corn kernels to ammonia (e.g., gas-phase anhydrous) under conditions effective to remove the hull from corn kernels. Conditions to effectively remove the hull from corn kernels include the following: Gas-phase anhydrous ammonia is preferred, though liquid ammonia or aqueous ammonia could also be used. The corn kernels are exposed to the ammonia generally for about 5 seconds (e.g., 5 seconds) to about 30 minutes (e.g., 30 minutes), preferably for about 5 seconds (e.g., 5 seconds) to about 5 minutes (e.g., 5 minutes), more preferably for about 10 seconds (e.g., 10 seconds) to about 60 seconds (e.g., 60 seconds), most preferably for about 20 seconds (e.g., 20 seconds) to about 30 seconds (e.g., 30 seconds). The concentration of gas-phase anhydrous ammonia is generally about 0.1 atmospheres (e.g., 0.1 atmospheres) to about 2 atmospheres (e.g., 2 atmospheres), preferably about 0.25 atmospheres (e.g., 0.25 atmospheres) to about 1.5 atmospheres (e.g., 1.5 atmospheres), and more preferably about 0.5 atmospheres (e.g., 0.5 atmospheres) to about 1 atmospheres (e.g., 1 atmospheres). The reaction temperature is generally about 0° C. (e.g., 0° C.) to about 50° C. (e.g., 50° C.), preferably about 10° C. (e.g., 10° C.) to about 40° C. (e.g., 40° C.), and more preferably about 20° C. (e.g., 20° C.) to about 30° C. (e.g., 30° C.).

After exposing the corn kernels to ammonia (e.g., gas-phase anhydrous), one can use standard corn processing methods. For example, the ammonia exposed corn kernels may either be (1) placed in water to produce a slurry which is milled and the milled slurry is soaked (steeped) or (2) placed in solvent (e.g., 70% ethanol) and the slurry of corn in solvent is milled, then the milled slurry is soaked (extracted). The processing between ammonia treatment and soaking (steeping) is very rapid. There is no set hold time, just the time it takes for the continuous process stream to flow through the mill, which generally is no more than a few seconds. For the temperature, one would use hot recycled process water so the heating would be immediate (and not require a separate heating step because the slurry would already be hot and would flow directly from the mill to the steep tank, where the time and temperature would be controlled).

As noted above, after exposing the corn kernels to ammonia (e.g., gas-phase anhydrous), the ammonia exposed corn kernels may be placed in water to produce a slurry which is milled and the milled slurry is soaked (steeped). Generally the weight of water to the weight of corn is about 1 to about 5 times the weight of corn, about 1.5 to about 3 times the weight of corn, or about 2 times the weight of corn. The soaking (steeping) time is generally about 2 to about 8 hours, about 4 to about 6 hours, or about 6 hours. The steeping temperature is generally about 40° to about 70° C., about 55° to about 65° C., or about 58° to about 60° C.

As noted above, after exposing the corn kernels to ammonia (e.g., gas-phase anhydrous), the ammonia exposed corn kernels may be placed in solvent (e.g., 70% ethanol) and the slurry of corn in solvent is milled, then the milled slurry is soaked (extracted). Generally, the weight of solvent to the weight of corn is about 1 to about 10 times the weight of corn, about 1.5 to about 5 times the weight of corn, or about 2 to about 4 times the weight of corn. The solvent is generally an organic solvent; for example, 50 to 90% ethanol in water or 65 to 75% ethanol in water. The steeping time is generally about 0.1 to about 8 hours, about 0.5 to about 4 hours, or about 1 to about 2 hours. The steeping temperature is generally about 20° to about 100° C., about 30° to about 80° C., or about 40° to about 60° C.

The following examples are intended only to further illustrate the invention and are not intended to limit the scope of the invention as defined by the claims.

EXAMPLES

Materials and Methods

A yellow dent corn hybrid (Pioneer 33A13) grown during the 2000 crop season at the Agricultural Engineering Farm, University of Illinois at Urbana-Champaign, was used for the study. Corn samples were hand cleaned to remove broken corn and foreign material, packaged in plastic bags and stored in a cold room (4° C.) until processed. To measure the moisture content of corn, the sample (untreated or treated corn or dry germ) was weighed in a tared vessel, then dried in a 70° C. vacuum oven for 64 hours, cooled in a desiccator and weighed.

Eight batches of corn were treated with ammonia, sheared in a disk mill (Quaker City Mill, Philadelphia, Pa.) to tear off the pericarp and expose the endosperm, then steeped, two batches at each of four steeping times: 2, 4, 6, and 8 hours. Two conventional batches (whole corn steeped for 24 hours) and two control batches (sheared without ammonia treatment and steeped for 6 hours) completed the experimental design. After steeping, each sample was degermed and the yield of oil was determined.

Each treated batch started with 800 g of cleaned corn. Two 25 g samples were taken for moisture, titration and free amino nitrogen (FAN) analysis. The remainder (approximately 750 g) was weighed and placed in a bomb reactor consisting of a 10-inch (25 cm) length of 3-inch (7.6 cm) diameter sanitary pipe, insulated and closed with blanks on both ends. A cylinder of pure anhydrous ammonia was attached through stainless tubing to the bottom of the reactor. The top was attached to a vacuum source through a trap of dilute sulfuric acid with phenolphthalein indicator. The reactor top was also equipped with a pressure transducer and a temperature sensor.

Before adding the corn, the reactor was warmed with a heat lamp to 35° C., then allowed to cool to 30° C. before adding the corn in order to avoid condensation of water vapor on the cool reactor walls. After sealing the corn in the reactor, vacuum was applied, connection to the vacuum was then closed, and a valve to the 10 psig (69 kPa) regulated ammonia source was opened and then closed exactly 6 seconds later. Then 20 seconds later, the bottom of the reactor was opened to atmosphere through a a rotameter, and the connection to vacuum was partially opened to draw 7 liters per minute of air through the reactor for 75 seconds.

After treatment, the treated corn was dumped from the reactor into a plastic container with a tight top, mixed and weighed. Two 25 g samples were taken for moisture, titration and FAN analysis, and two more 25 g samples were taken for immediate titration and FAN analysis. The remaining treated corn (approximately 650 g) was added to 650 ml cold tap water to quench the reaction. The time from first exposure to ammonia until quenching was 5.5 minutes. Ten minutes after quenching, the treated corn was sheared in the Quaker City (QCM) (Quaker City model 4E, The Staub. Co., Hatboro, Pa.). The QCM has a stationary and one rotating disks. The disks are corrugated and can be adjusted for gap setting. Shearing of corn kernels was done with disk gap set to maximum.

All batches were steeped in a one-half gallon (2 liter) plastic vessel fitted with a conical bottom with a stainless screen. The steep tank initially contained 650 ml of hot (70° C.) tap water. The slurry of treated and sheared corn in water (control was only sheared in 650 ml water) or 650 g whole corn in 650 ml water (conventional steeping) was added to the steep tank. Then 3.84 gm of sodium metabisulfite and 7.15 ml. of 85% lactic acid were added to give approximately 2000 ppm of $SO_2$ and 0.55% lactic acid in the steep water. Steeping temperature (59° C.) was maintained by indirect heating. A peristaltic pump circulated the steep water through a heat exchanger consisting of a glass condenser. On the hot side of the heat exchanger, hot water was circulated from a bath maintained at no more than 70° C. to avoid gelatinizing starch in the steep water.

After steeping, each batch was ground using the commercial grade Waring blender (model 7010G, Waring Products Division, New Hartford, Conn.).equipped with a 15-amp motor, and a 4 L container with blades that were reversed so the leading edge of the blade was blunt. Blades were reversed so that blending would provide only shearing action and not cutting action on the corn kernels. The batch was ground for 3 min at 35% of full power, followed by 1 min at 30% of full power. These power settings on the blender were previously optimized for this study. Grinding at the optimum blender power setting gave, at the end of the grind, small amounts of whole kernel and minimum germ damage. After grinding, germ was skimmed by the same procedure as previously reported (Eckhoff, S. R., et al., Cereal Chem. 70(6):723–727 (1993)).

Dry germ was weighed and samples were analyzed for moisture content. To measure total lipids, dry germ samples of approximately 3–4 g were powdered by grinding in a mortar and pestle. This material was then ground in a blender with 150 mL of chloroform: methanol (C:M) (2:1, v/v) filtered through a sintered glass funnel (Coarse) and the residue on the funnel reground with an additional 150 mL of C:M and refiltered. The extract was dried under a stream of nitrogen and redissolved in chloroform: methanol: water (10:5:3, v/v) according to the method used by Folch (Folch, J., M., et al., J. Biol. Chem., 226(1): 497–509 (1957)). The lower organic layer was removed and dried under nitrogen to obtain the total lipid dry weight. The oil yield was calculated by multiplying the germ yield by the total lipid content of the germ.

Lipid extracts were analyzed by HPLC according to the methods used by Hamilton (Hamilton, J. G., et al., Lipids, 23(12): 1150–1153 (1988)). A Lichrosorb SI-60 column, 250×4.6 mm was purchased from Supelco (Bellfonte, Pa.) and operated at a flow rate of 2 mL/min using a mobile phase of hexane:isopropanol:glacial acetic acid (100:2:0.02, v/v). Detection of fatty acids and diacylglycerides was by UV detection at 206 nm. Standards consisting of oleic acid and oleic acid glycerides were used to estimate the relative amounts of each lipid class detected in these extracts.

Titration and FAN values for untreated corn measured before drying for moisture analysis were similar to values obtained after drying. Reported results are from samples measured after drying. On the other hand, titration and FAN values for treated corn analyzed immediately were higher than for treated samples analyzed after drying for moisture analysis because some of the absorbed ammonia evaporated in the vacuum oven. The difference in titration or FAN between treated samples analyzed immediately and untreated samples indicated the amount of ammonia absorbed during the treatment. The difference in titration or FAN between vacuum-dried, treated samples and untreated samples indicated the amount of ammonia that reacted with the corn to form ammonium salts or other non-volatile products.

For titration, the sample was placed in 750 ml deaerated, deionized water in a blender, and blended for 2 minutes. The blended sample was transferred to a beaker on a magnetic stirrer, and titrated with a pH meter to pH 7.0 with 0.2 N sulfuric acid (treated samples titrated immediately) or 0.1 N sodium hydroxide (untreated samples and treated, vacuum-dried samples). After titration, a small amount of liquid was clarified by filtration through a 0.2 micron syringe filter and analyzed for free amino nitrogen (FAN) by the ninhydrin method (Method Wort-12 of the American Society of Brewing Chemists, Methods of Analysis, 1992). The FAN values for untreated samples were calculated based on a glycine standard. For treated samples, the untreated value was subtracted, and the remainder was calculated based on an ammonium chloride standard. The ammonium standard gave less color than the glycine standard by a factor of 3.45 at equal molar concentrations.

Results

The moisture content of untreated corn decreased from approximately 12% to 11% during storage from the first batch to the last batch. Average moisture content of untreated corn was 11.64% and average moisture content of treated corn was 11.51%. Taking into account the fact that the weight of treated corn included approximately 0.1% volatile ammonia that was counted as moisture, the actual loss of moisture on treatment was approximately 0.2%.

Typical pressure and temperature data collected during anhydrous ammonia treatment are shown in FIG. 1. The temperature increased slightly during treatment because solution of ammonia in water is exothermic. The maximum pressure at the end of the six-second flow of ammonia into the reactor varied from 1.3 to 5.1 psig. The minimum vacuum after closing the ammonia inlet varied from −7.9 to −5.3 psig. The fact that the ammonia partial pressure of approximately 0.5 atmosphere was still decreasing when air was admitted to the reactor indicates that the corn was less than saturated with ammonia at this pressure. It may be concluded that a similar amount of ammonia would be absorbed upon exposure for a similar time to a mixture of half air and half ammonia.

Pre-evacuation of the reactor may have removed air from pores in the kernels and thus speeded the diffusion of ammonia into those pores. However, in these experiments, pre-evacuation was necessary to provide even distribution of anhydrous ammonia throughout the reactor. Without such pre-evacuation, corn near the ammonia inlet (bottom of the reactor) would have absorbed much more ammonia than corn at the far end (top) of the reactor. On a larger scale, rapid recirculation of a mixture of air and ammonia through a moving bed of corn at atmospheric pressure should produce similar results without the need for vacuum or pressure.

TABLE 1

| | TITRATION DATA, meq/kg | | | | |
|---|---|---|---|---|---|
| Batch | Untreated (a) | Treated Immediate Sample (b) | Treatment Total (b-a) | Treated Vacuum-dried (c) | Treatment Non-volatile (c-a) |
| 1 | −37.6 | 33.8 | 71.4 | −28.8 | 8.8 |
| 2 | −38.7 | 37.1 | 75.8 | −24.0 | 14.7 |
| 3 | −37.5 | 15.8 | 53.3 | −25.2 | 12.2 |
| 4 | −38.2 | 41.1 | 79.3 | −22.6 | 15.7 |
| 5 | −33.7 | 42.3 | 76.0 | −19.6 | 14.1 |
| 6 | −36.1 | 29.0 | 65.1 | −17.5 | 18.5 |
| 7 | −34.9 | 38.2 | 73.0 | −18.7 | 16.2 |
| 8 | −34.9 | 37.4 | 72.3 | −22.5 | 12.4 |
| Average | −36.4 | 34.3 | 70.8 | −22.4 | 14.1 |
| Std. Dev. | 1.82 | 8.56 | 8.98 | 3.72 | 2.96 |
| mg N per kg corn | | | 991 | | 197 |

Note:
Negative numbers indicate titration with base to pH 7.
Positive numbers indicate titration with acid to pH 7.

Treatment resulted in a weight increase varying from 0.09% to 0.14% (average 0.12%) or approximately 1 g N per kg corn. From the titration data (Table 1), the difference between the average of titration values for untreated corn and for treated corn sampled immediately was 71 meq/kg (0.99 g N per kg corn), in agreement with weight data. Titration of vacuum-dried, treated samples showed that most of the absorbed nitrogen was volatile. The calculated average amount of non-volatile (reacted) ammonium was 14 meq/kg (0.20 g N per kg corn).

TABLE 2

FREE AMINO NITROGEN (FAN) DATA, mg N per kg corn

| Batch | Untreated (a) | Treated Immediate Sample (b) | Treatment Total (b-a) | Treated Vacuum-dried (c) | Treatment Non-volatile (c-a) |
|---|---|---|---|---|---|
| 1 | 158 | 1339 | 1180 | 483 | 326 |
| 2 | 165 | Missing | | 495 | 330 |
| 3 | 168 | Missing | | 414 | 247 |
| 4 | 167 | 1020 | 852 | 453 | 286 |
| 5 | 145 | 1143 | 999 | 503 | 358 |
| 6 | 169 | 1096 | 927 | 367 | 198 |
| 7 | 168 | 1065 | 897 | 400 | 233 |
| 8 | 162 | 1030 | 868 | 430 | 268 |
| Average | 163 | 1115 | 953 | 443 | 280 |
| Std Dev. | 8.2 | 118 | 122 | 48 | 54 |

Results calculated from free amino nitrogen data (Table 2) were in agreement with titration and weight data. The average amount of FAN absorbed as ammonia in treated corn sampled immediately was 0.95 g N per kg corn. Of this, the amount remaining in vacuum-dried, treated sample was 0.28 g N per kg corn. Free amino nitrogen (as glycine) of untreated corn averaged 0.16 g N per kg corn. Assuming a mash of 25% corn, untreated corn supplies only 40 mg/L FAN, while treated corn will supply approximately 250 mg/L additional FAN. This is approximately the minimum nitrogen supplementation needed for optimum yeast fermentation (Thomas, K. C., et al., Applied and Environmental Microbiology, 56(7): 2046–2050 (1990)).

Figure 2:
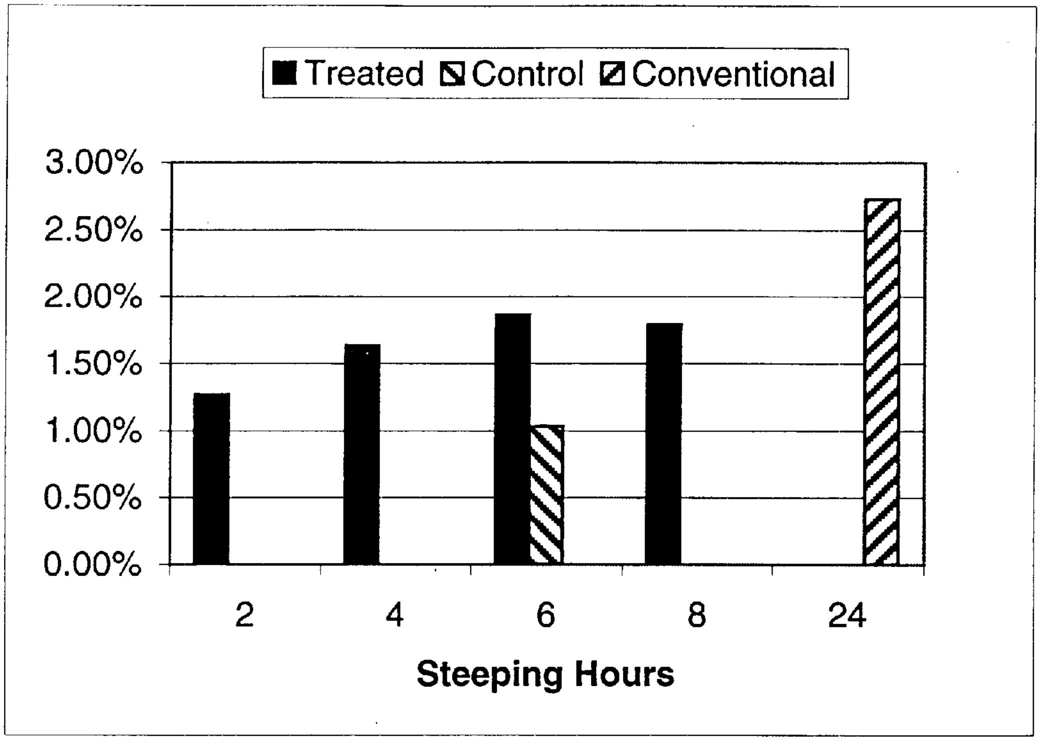
FIG. 2 shows oil yields (dry corn basis) for ammonia treated corn, conventionally treated corn, and for a control (each bar represents the average of data from two batches).

Loosening of the hulls by treatment with ammonia was demonstrated qualitatively and quantitatively. Qualitatively, differences were observed during shearing in the disk mill between treated corn and the untreated controls. Shearing of ammonia treated corn kernels resulted in more pericap fiber removal and less broken kernel. Whereas for untreated corn kernels less pericap fiber removal and more damage to kernels (broken kernels) was noticed. Quantitatively, the effect of ammonia treatment can be seen in the oil yield data. As shown in FIG. 2, the oil yield from treated samples increased with steeping time up to 6 hours. Yields at 6 and 8 hours were not significantly different. These yields of 1.8 to 1.9% (corn dry weight basis) were significantly greater than the 1.0% yield for the control samples that were sheared without ammonia treatment and steeped for 6 hours. These yields were significantly less than the 2.7% yield from conventional 24-hour steeping, but the ammonia treatment was for six hours instead of 24 hours and avoids the large conventional steeping tanks which are expensive (thus saving on capital costs for building a plant).

It can be concluded that loosening of the hulls by ammonia treatment allowed them to be torn from the kernels by coarse grinding. This allowed the germ to absorb more water during steeping, and allowed more of the soluble protein and salts in the germ to leach out. As a result, the germ in treated samples was lighter (less dense) and softer (more rubbery), so that the germ was less likely to break and more likely to float during germ recovery.

TABLE 3

GERM YIELD AND OIL DATA, weight percent, dry basis

| Batch | Steep Time hours | Germ Yield % of corn | Total Lipids % of germ | Free Fatty Acid % of total lipids |
|---|---|---|---|---|
| 1 | 6 | 6.59% | 25.7% | 2.8% |
| 2 | 4 | 5.85% | 29.7% | 3.7% |
| 3 | 6 | 6.75% | 30.1% | 4.6% |
| 4 | 2 | 5.16% | 25.2% | 4.8% |
| 5 | 8 | 6.69% | 31.5% | 4.3% |
| 6 | 2 | 4.92% | 25.3% | 3.2% |
| 7 | 8 | 6.31% | 23.4% | 3.1% |
| 8 | 4 | 5.33% | 28.8% | 4.6% |
| Control | 6 | 6.01% | 16.4% | 6.8% |
| Control | 6 | 5.95% | 18.1% | 5.4% |
| Conventional | 24 | 6.32% | 43.8% | 8.3% |
| Conventional | 24 | 6.24% | 43.0% | 9.0% |

As shown in Table 3, the free fatty acid content of total lipids extracted from germ varied from 3% to 9%. These numbers are high compared with commercial crude corn oil, which is generally from 1% to 3½% free fatty acid (Strecker, L. R., et al., 1996, Corn oil, In Bailey's Industrial Oil and Fat Products, Vol. 2, Y. H. Hui, ed., p. 143). Free fatty acids in treated samples were less than in untreated controls. These data may be explained by the presence of endogenous lipase, which may be activated by steeping, but inactivated by ammonia treatment. In most samples, no partial glycerides were detected (data not shown). It can be concluded that treatment with ammonia caused no degradation of corn oil quality.

In conclusion, the techniques and apparatus disclosed herein for exposing whole corn kernels to ammonia produced reliable and reproducible results. Data and qualitative observations showed that treatment with ammonia loosened the pericarp (hull) so that it could be torn off by lightly shearing in a disk mill and that the germ could then be recovered after a short (6 hour) steep. The amount of ammonia absorbed by the corn was equivalent to the minimum nitrogen supplementation required for yeast fermentation to ethanol. Ammonia treatment did not degrade the quality of the corn oil.

All of the references cited herein are incorporated by reference in their entirety.

Thus, in view of the above, the present invention concerns (in part) the following:

A method of removing the hull from corn kernels, comprising (consisting essentially of or consisting of) exposing corn kernels to ammonia under conditions effective to remove said hulls from the corn kernels.

The above method, wherein the ammonia is gas-phase anhydrous ammonia.

The above method, wherein the corn kernels are exposed to ammonia for about 5 seconds to about 30 minutes.

The above method, wherein the corn kernels are exposed to ammonia for about 5 seconds to about 5 minutes.

The above method, wherein the corn kernels are exposed to ammonia for about 10 seconds to about 60 seconds.

The above method, wherein the corn kernels are exposed to ammonia for about 20 seconds to about 30 seconds.

The above method, wherein the concentration of the gas-phase anhydrous ammonia is about 0.1 atmospheres to about 2 atmospheres.

The above method, wherein the concentration of the gas-phase anhydrous ammonia is about 0.25 atmospheres to about 1.5 atmospheres.

The above method, wherein the concentration of the gas-phase anhydrous ammonia is about 0.5 atmospheres to about 1 atmospheres.

The above method, wherein the corn is exposed to ammonia at a temperature of about 0° C. to about 50° C.

The above method, wherein the corn is exposed to ammonia at a temperature of about 10° C. to about 40° C.

The above method, wherein the corn is exposed to ammonia at a temperature of about 20° C. to about 30° C.

The above method, further comprising combining the ammonia exposed corn kernels with water to produce a slurry, milling the slurry to produce a milled slurry, and steeping the milled slurry.

The above method, further comprising combining the ammonia exposed corn kernels with solvent to produce a slurry, milling the slurry to produce a milled slurry, and steeping the milled slurry.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method of removing the hull from corn kernels, comprising exposing corn kernels to ammonia under conditions effective to remove said hulls from said corn kernels.

2. The method according to claim 1, wherein said ammonia is gas-phase anhydrous ammonia.

3. The method according to claim 1, wherein said corn kernels are exposed to said ammonia for about 5 seconds to about 30 minutes.

4. The method according to claim 1, wherein said corn kernels are exposed to said ammonia for about 5 seconds to about 5 minutes.

5. The method according to claim 1, wherein said corn kernels are exposed to said ammonia for about 10 seconds to about 60 seconds.

6. The method according to claim 1, wherein said corn kernels are exposed to said ammonia for about 20 seconds to about 30 seconds.

7. The method according to claim 2, wherein the concentration of said ammonia is about 0.1 atmospheres to about 2 atmospheres.

8. The method according to claim 2, wherein the concentration of said ammonia is about 0.25 atmospheres to about 1.5 atmospheres.

9. The method according to claim 2, wherein the concentration of said ammonia is about 0.5 atmospheres to about 1 atmospheres.

10. The method according to claim 1, wherein said corn is exposed to said ammonia at a temperature of about 0° C. to about 50° C.

11. The method according to claim 1, wherein said corn is exposed to said ammonia at a temperature of about 10° C. to about 40° C.

12. The method according to claim 1, wherein said corn is exposed to said ammonia at a temperature of about 20° C. to about 30° C.

13. The method according to claim 1, further comprising combining the ammonia exposed corn kernels with water to produce a slurry, milling said slurry to produce a milled slurry, and steeping said milled slurry.

14. The method according to claim 1, further comprising combining the ammonia exposed corn kernels with solvent to produce a slurry, milling said slurry to produce a milled slurry, and steeping said milled slurry.

* * * * *